(12) United States Patent
Kwon

(10) Patent No.: US 6,819,232 B2
(45) Date of Patent: Nov. 16, 2004

(54) METHOD OF CHANGING AN AIR FILTER OF VEHICLE AIR CONDITIONING SYSTEM

(75) Inventor: Jong Hwan Kwon, Kyungki-do (KR)

(73) Assignee: Hyundai Motor Company, Seoul (KR)

(*) Notice: Subject to any disclaimer, the term of this patent is extended or adjusted under 35 U.S.C. 154(b) by 10 days.

(21) Appl. No.: 10/331,885

(22) Filed: Dec. 30, 2002

(65) Prior Publication Data
US 2004/0041710 A1 Mar. 4, 2004

(30) Foreign Application Priority Data
Sep. 2, 2002 (KR) .................. 10-2002-0052558

(51) Int. Cl.$^7$ .................................. B60Q 1/00
(52) U.S. Cl. .............. 340/449; 340/457.4; 340/438; 340/606; 340/607; 340/609; 340/580; 340/581
(58) Field of Search .................. 340/449, 457.4, 340/438, 606, 607, 609, 580, 581

(56) References Cited

U.S. PATENT DOCUMENTS 6,448,896 B1 * 9/2002 Bankus et al. .............. 340/607
6,542,074 B1 * 4/2003 Tharman et al. ......... 340/457.4

* cited by examiner

Primary Examiner—Daniel J. Wu
Assistant Examiner—Tai T. Nguyen
(74) Attorney, Agent, or Firm—Morgan Lewis & Bockius LLP

(57) ABSTRACT

A method of signaling for a change of an air filter of a vehicle air conditioning system is disclosed. The present invention uses a sensor installed in a conventional air conditioner and the appropriate time for changing the air filter is determined by checking compressor operation when a degree of airflow is decreased during air conditioner operation.

5 Claims, 3 Drawing Sheets

METHOD OF CHANGING AN AIR FILTER OF VEHICLE AIR CONDITIONING SYSTEM

FIELD OF THE INVENTION

The present invention relates to air filters for vehicle air conditioning systems, and more particularly, to a method and apparatus for setting an alarm to signal a change of the air filter.

BACKGROUND OF THE INVENTION

Generally, an air-conditioning duct is provided in a vehicle for the purpose of circulating interior air or keeping it at a comfortable level. Air filters are installed in several places of the air-conditioning duct for purifying air flowing into the vehicle.

For purifying the flowing air and maintaining the comfortable air temperature and quality, the air filters should be maintained in an optimized condition and they should be replaced when they do not perform a proper function. In fact, air filters are frequently changed in a seriously polluted area such as an urban area, but in a rural area, there is no need to frequently change the air filters. Generally, the driver determines the time to change the air filters based on mileage of a vehicle. However, changing air filters in this way is not ideal because it is hard to maintain optimum air-cleaning performance for the air filters and there may also arise an additional cost for unnecessary changes.

As a way to overcome the problem, several methods of signaling the need for a change of an air filter have been suggested. For example, the degree of pollution at the front and rear portions of air filter may be measured. Also, signaling a change using a pressure developed when an air filter is blocked or generating sound by installing an orifice in an air filter have been considered. However, these methods of signaling the need for change of an air filter of a vehicle air conditioning system generate problems that increase the number of parts and processes and thus increase cost because a particular sensor must be set or installed.

SUMMARY OF THE INVENTION

Embodiments of the present invention to provide methods for setting an alarm to signal the need for a change of an air filter in a vehicle air conditioning system which can inform of the appropriate time when air filters, which are installed for optimal purification of air flow into a vehicle interior, are to be changed without using a particular sensor.

In a preferred embodiment, the time for an air filter change is signaled based on checking operation of the compressor when the quantity of airflow is decreased, using a sensor already installed in a conventional air conditioning system. More preferably, an embodiment of the invention turns on a blocked filter alarm lamp according to the number of compressor cycles, which are associated with a state of the air filter.

BRIEF DESCRIPTION OF THE DRAWINGS

The above objects and other characteristics and advantages of the present invention will become more apparent by describing in detail a preferred embodiment thereof with is reference to the attached drawings, in which.

DETAILED DESCRIPTION OF THE INVENTION

Hereinafter, a method for signaling for a change of an air filter in a vehicle air conditioning system according to a preferred embodiment of the present invention will be explained in more detail with reference to the accompanying drawings.

Figure 4:
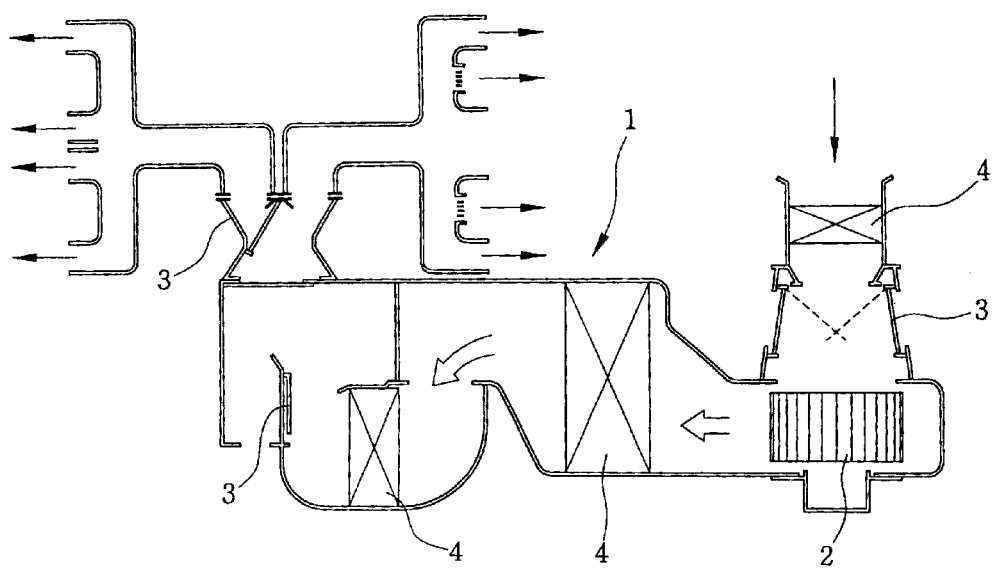
FIG. 4 is a view for illustrating an air-conditioning duct system.

As shown in FIG. 4, an air conditioning duct system 1 includes the plurality of ducts, pipes or hoses which are connected with one another, a blower 2, and a gate valve 3. A plurality of air filters 4 are installed at several places of the air conditioning duct system 1 to purify air flowing into the vehicle room, thereby maintaining comfortable passenger compartment air.

An air-conditioning system for a vehicle according to the invention also has a heat exchanger that cools the air, also referred to as an evaporator. When air is continuously cooled by using the heat exchanger, the air falls to a subzero temperature, such that the heat exchanger can be blocked by the ice created by the freezing of the condensate water (ice phenomenon). In order to prevent the ice phenomenon, a temperature of the evaporator is measured, and the compressor is caused to intermittently stop before the temperature falls down to subzero. Although the ice phenomenon may be prevented by using a variable compressor, a compressor having a fixed capacity is used in most cases.

Figure 2:
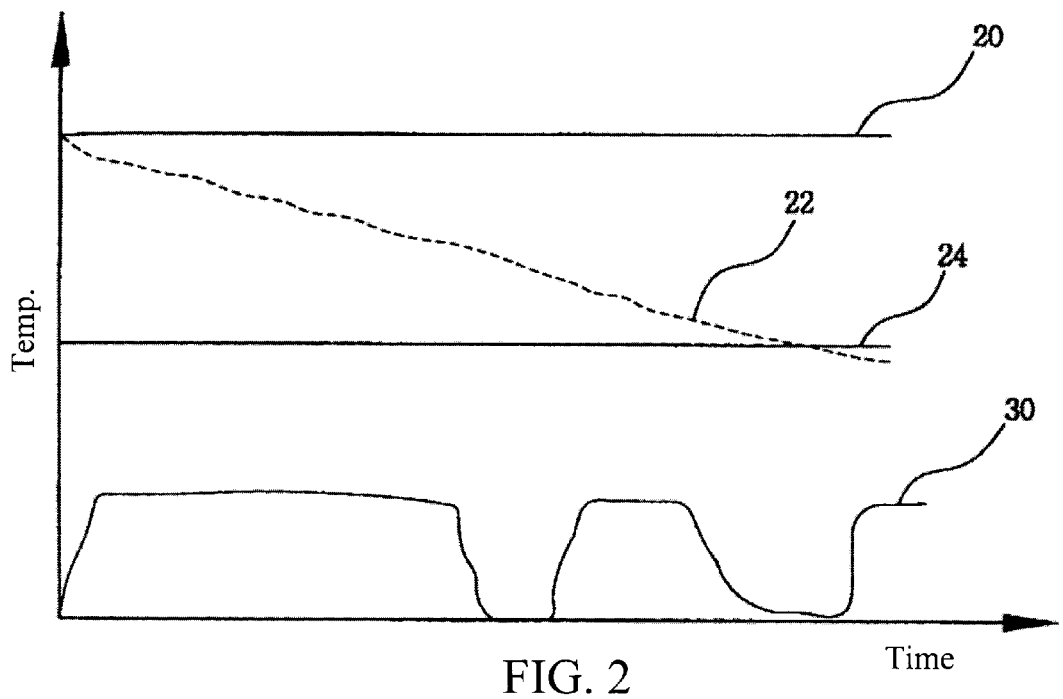
FIG. 2 is a temperature-to-time graph of illustrating a compressor cycling when an air filter is normal.

As shown in FIG. 2, when an ambient temperature 20 is a predetermined temperature or higher (summer) and a preset passenger compartment temperature 24 is a minimum temperature, the air-conditioner is driven at the maximum. In this way, when the air filter is normal and the air conditioner is driven, the compressor is driven at the first stage to decrease the temperature. When the passenger compartment temperature is decreased, the temperature of the evaporator becomes low and cycling occurs with the compressor intermittently interrupted to prevent the ice phenomenon. The operation time period of the compressor is increased because of much increased airflow. That is, the thermal load is heavy and the cycling becomes much longer.

Figure 3:
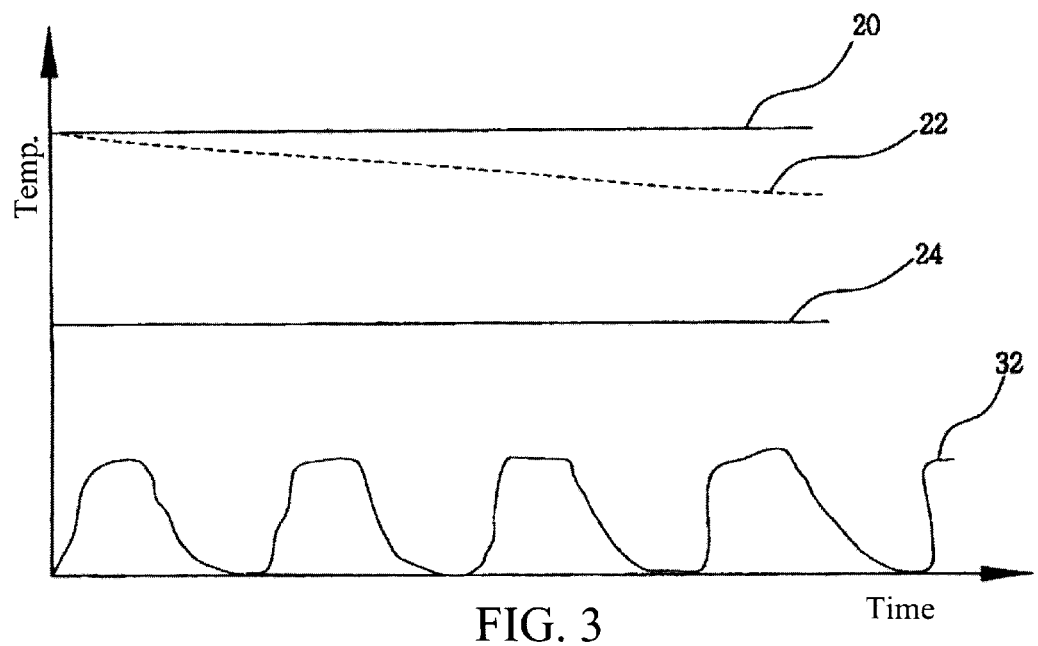
FIG. 3 is a temperature-to-time graph of showing a cycling of a compressor when an air filter is blocked.

Under the same conditions as shown in FIG. 2, but when the air filter is blocked, as shown in FIG. 3, the compartment temperature 22 does not reach the preset temperature 24 even after a significant time period. This is because the thermal load is decreased and the airflow passing through the evaporator is small, the compartment temperature 22 is high and the temperature of the evaporator is decreased rapidly, such that compressor cycling is frequent.

In FIG. 2 and FIG. 3, an ECU (Electronic Control Unit) signal had been used as the input signals. These signals are generated when the air conditioner is turned on, the flow is set at the level of, for example, four (maximum level), the ambient temperature is sensed by an ambient sensor, the compartment temperature is sensed by a room sensor, and the preset compartment temperature is set by a driver driving lever, and as a compressor clutch turned-on signal.

Using the phenomenon shown in FIG. 2 and FIG.3, when a driver drives the air conditioner, sets the temperature at the minimum temperature, and sets the blower level at the maximum level at the state that the ambient temperature is higher than a predetermined temperature, it is understood how the compartment temperature is changed according to the operation of air conditioner and whether a proper airflow is provided by using an operation signal of the compressor. Further, as shown in FIG. 3, if compressor cycling is frequently generated owing to abnormality of the compressor, such as the fact that the air filter is blocked, a signal to change the air filter can be sent to the driver.

Figure 1:
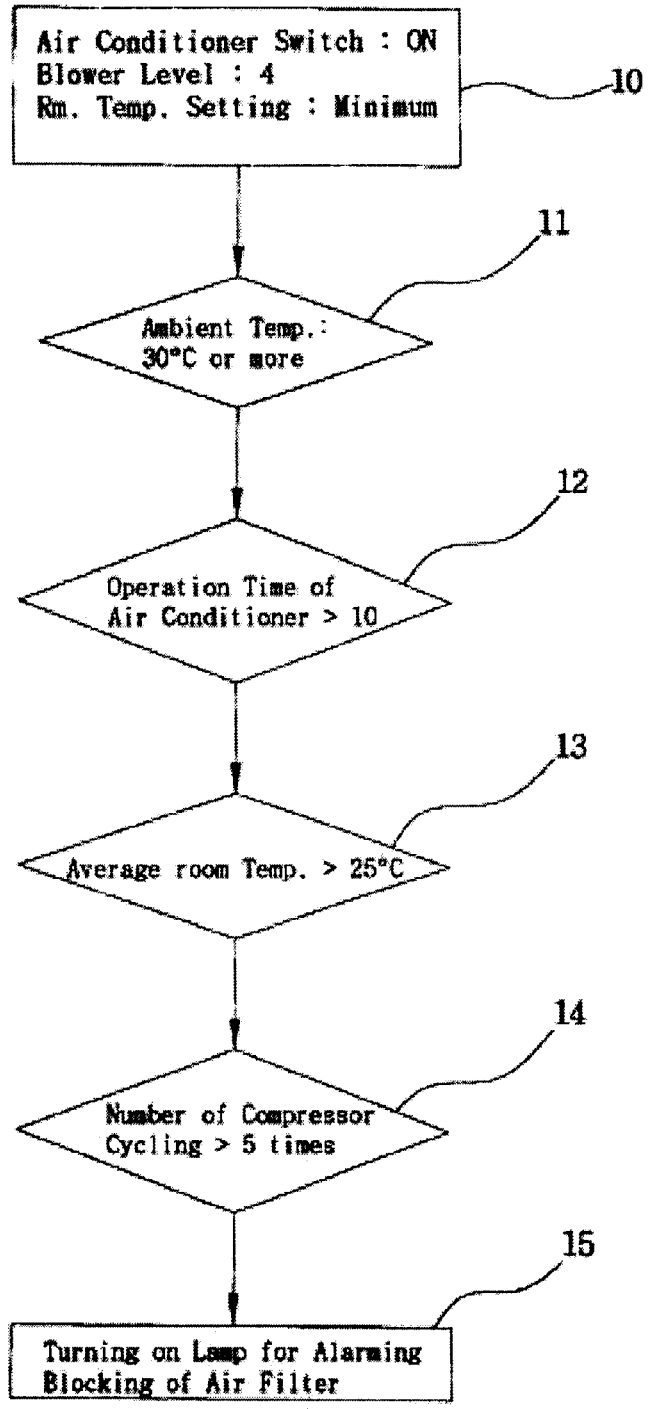
FIG. 1 is a flow chart of illustrating a method signaling for a change of an air filter of a vehicle air conditioning system according to the present invention.

As shown in FIG. 1, in a first step 10, a driver turns on the air conditioner, and at the same time, sets the blower at a maximum level and sets the passenger compartment temperature at the lowest temperature.

In a next step, existing conditions are sensed by a temperature sensor. These conditions may be, for example, that the ambient temperature is 30° C. or higher 11, the operation of the air conditioner is maintained at least for 10 min. 12, and/or the average room temperature is 25° C. or higher 13. In a next step 14, when the number of compressor cycles is five times or more, the blocked air filter alarm lamp 15 is turned on. It will be understood that values for the ambient temperature, the operation time of the air conditioner, and the average room temperature are variable. Persons of ordinary skill in the art will appreciate that the references may be set according to each vehicle.

Therefore, without a specialized sensor, but a sensor already installed for controlling a compressor, the appropriate time for changing the air filter is signaled to a driver by checking compressor operation according to a decreased degree of airflow in driving the air conditioner. And therefore, driver easily knows the time when the air filter must be changed, it is possible to reduce poor performance of the air conditioner. Further, the pollution owing to a late changing time of the air filter and a cost occurrence owing to the advanced changing time of the air filter are prevented.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A method for signaling a change of an air filter for an air conditioning system of a vehicle, comprising:
   turning on an air conditioner and setting a blower at a maximum level to set a passenger compartment temperature at a lowest temperature of the air conditioner;
   sensing the presence of at least one signaling condition; and
   signaling a need for a new air filter when an air conditioner compressor cycles five times or more and at least one said signaling condition is present.

2. The method as claimed in claim 1, wherein said signaling conditions include an ambient temperature of 30° C. or higher, the air conditioner operated at least for 10 mm, and an average compartment temperature of 25° C. or higher.

3. The method as claimed in claim 2, wherein the ambient temperature, the operation time period of the air conditioner, and the average compartment temperature are set according to a type of the vehicle, respectively.

4. The method as claimed in claim 2, wherein said signaling occurs when all said signaling conditions are sensed.

5. The method as claimed in claim 1, wherein said signaling comprises automatically turning on a lamp.

* * * * *